US012009889B2

(12) United States Patent
Ma

(10) Patent No.: US 12,009,889 B2
(45) Date of Patent: Jun. 11, 2024

(54) UPLINK DATA TRANSMISSION METHOD, USER EQUIPMENT, AND READABLE STORAGE MEDIUM

(71) Applicant: BEIJING UNISOC COMMUNICATIONS TECHNOLOGY CO., LTD., Beijing (CN)

(72) Inventor: Dawei Ma, Shanghai (CN)

(73) Assignee: BEIJING UNISOC COMMUNICATIONS TECHNOLOGY CO., LTD., Beijing (CN)

(*) Notice: Subject to any disclaimer, the term of this patent is extended or adjusted under 35 U.S.C. 154(b) by 33 days.

(21) Appl. No.: 17/798,736

(22) PCT Filed: Feb. 2, 2021

(86) PCT No.: PCT/CN2021/074744
§ 371 (c)(1),
(2) Date: Aug. 10, 2022

(87) PCT Pub. No.: WO2021/159988
PCT Pub. Date: Aug. 19, 2021

(65) Prior Publication Data
US 2023/0092868 A1    Mar. 23, 2023

(30) Foreign Application Priority Data
Feb. 13, 2020  (CN) .................... 202010090665.1

(51) Int. Cl.
H04B 7/04    (2017.01)
H04B 7/0456  (2017.01)
H04W 72/23   (2023.01)

(52) U.S. Cl.
CPC ........... *H04B 7/0456* (2013.01); *H04W 72/23* (2023.01)

(58) Field of Classification Search
CPC .. H04B 7/0456; H04W 72/21; H04W 72/232; H04W 72/04; H04W 72/0446
See application file for complete search history.

(56) References Cited

U.S. PATENT DOCUMENTS

2012/0275411 A1   11/2012  Kim et al.
2018/0367205 A1   12/2018  Liu et al.
(Continued)

FOREIGN PATENT DOCUMENTS

CN   110463066 A   11/2019
CN   110535508 A   12/2019
(Continued)

OTHER PUBLICATIONS

CATT, "Further discussion on codebook based transmission for UL", 3GPP TSG RAN WG1 Meeting 90bis, R1-1717807, Oct. 9-13, 2017, 5 pages.
(Continued)

*Primary Examiner* — Rahel Guarino
(74) *Attorney, Agent, or Firm* — CANTOR COLBURN LLP

(57) ABSTRACT

An uplink data transmission method, a user equipment, and a readable storage medium are provided. The method includes: receiving DCI, wherein the DCI includes a sounding reference signal resource indication field and a precoding information field, the sounding reference signal resource indication field includes indication information of two or more transmission beams corresponding to to-be-transmitted uplink data, and the precoding information field includes transmission precoding matrix indication information corresponding to each of the two or more transmission beams;

(Continued)

determining a transmission precoding matrix corresponding to each transmission beam based on the transmission precoding matrix indication information corresponding to the transmission beam; and transmitting uplink data based on the transmission precoding matrix corresponding to each transmission beam. By the method, the transmission precoding matrices corresponding to multiple transmission beams are indicated in DCI, thereby improving reliability of uplink data transmission.

20 Claims, 2 Drawing Sheets

(56) References Cited

U.S. PATENT DOCUMENTS

| | | | |
|---|---|---|---|
| 2020/0083939 A1 | 3/2020 | Park et al. | |
| 2021/0050889 A1* | 2/2021 | Park | H04B 7/0639 |
| 2021/0367655 A1 | 11/2021 | Jiang et al. | |

FOREIGN PATENT DOCUMENTS

| | | |
|---|---|---|
| CN | 110535589 A | 12/2019 |
| CN | 110771071 A | 2/2020 |
| EP | 3562052 A1 | 10/2019 |
| EP | 4007179 A1 | 6/2022 |
| WO | 2018182381 A1 | 10/2018 |
| WO | 2019019839 A1 | 1/2019 |
| WO | 2019085998 A1 | 5/2019 |

OTHER PUBLICATIONS

JPO Notice of Reasons for Refusal for corresponding JP Application No. 2022-549223; dated Aug. 29, 2023.
Lenovo et al., "Discussion on UL multi-panel transmission", 3GPP TSG RAN WG1 Meeting #96bis, R1-1904574, Apr. 8-12, 2019.
EPO Extended European Search Report for corresponding EP Application No. 21753491.6; dated Jun. 27, 2023.
Zte et al., "Codebook based UL transmission", 3GPP TSG RAN WG1 Meeting 90bis, R1717417, Oct. 9-13, 2017, 6 pages.
Zte et al., "Remaining details on DL DMRS and UL DMRS", 3GPP TSG RAN WG1 Meeting 91, R1-1719542, Nov. 27-Dec. 1, 2017, 28 pages.
International Search Report for International Application No. PCT/CN2021/074744; dated Mar. 16, 2021.

* cited by examiner

UPLINK DATA TRANSMISSION METHOD, USER EQUIPMENT, AND READABLE STORAGE MEDIUM

CROSS-REFERENCE TO RELATED APPLICATIONS

This is the U.S. national stage of application No. PCT/CN2021/074744, filed on Feb. 2, 2021. Priority under 35 U.S.C. § 119(a) and 35 U.S.C. § 365(b) is claimed from Chinese Application No. 202010090665.1, filed Feb. 13, 2020, the disclosure of which is also incorporated herein by reference.

TECHNICAL FIELD

The present disclosure generally relates to communication technology field, and more particularly, to an uplink data transmission method, a User Equipment (UE), and a readable storage medium.

BACKGROUND

A base station sends uplink scheduling information to a UE through a Physical Downlink Control Channel (PDCCH) to schedule the UE to send a Physical Uplink Shared Channel (PUSCH).

In Rel-15 and Rel-16 specifications, the PDCCH can schedule the UE to send one or more PUSCHs. Downlink Control Information (DCI) carried by the PDCCH includes a Sounding Reference Signal Resource Indicator (SRI) field and a Precoding information and number of layers field. The SRI field is used to indicate a transmission beam of the PUSCH, and the precoding information and number of layers field is used to indicate transmission precoding matrix information and layer number information of the PUSCH. The Rel-15 and Rel-16 specifications require the UE to use the same transmission beam and the same transmission precoding matrix when transmitting each PUSCH.

According to goals of Rel-17 specifications, to improve transmission reliability of the PUSCH, when the PDCCH schedules the UE to transmit multiple PUSCHs, it is necessary to support each PUSCH to use a different transmission beam. Accordingly, corresponding to different transmission beams, the transmission precoding matrices may also be different.

SUMMARY

Embodiments of the present disclosure provide solutions for indicating transmission precoding matrices corresponding to multiple transmission beams in DCI, thereby improving reliability of PUSCH transmission.

In an embodiment of the present disclosure, an uplink data transmission method is provided, including: receiving DCI, wherein the DCI includes a sounding reference signal resource indication field and a precoding information field, the sounding reference signal resource indication field includes indication information of two or more transmission beams corresponding to to-be-transmitted uplink data, and the precoding information field includes transmission precoding matrix indication information corresponding to each of the two or more transmission beams; determining a transmission precoding matrix corresponding to each transmission beam based on the transmission precoding matrix indication information corresponding to the transmission beam; and transmitting uplink data based on the transmission precoding matrix corresponding to each transmission beam.

In an embodiment of the present disclosure, a computer readable storage medium having computer instructions stored therein is provided, wherein when the computer instructions are executed, any one of the above methods is performed.

In an embodiment of the present disclosure, a UE including a memory and a processor is provided, wherein the memory has computer instructions stored therein, and when the processor executes the computer instructions, any one of the above methods is performed.

DETAILED DESCRIPTION

The Rel-15 and Rel-16 specifications require a UE to use the same transmission beam and the same transmission precoding matrix when transmitting each PUSCH. To improve transmission reliability of the PUSCH, Rel-17 specifications proposed that each PUSCH can use a different transmission beam. However, there is no solution for how to indicate transmission precoding matrices corresponding to multiple transmission beams in DCI.

Embodiments of the present disclosure provide an uplink data transmission method. In the method, a precoding information field in DCI indicates transmission precoding matrices corresponding to multiple transmission beams. Therefore, a UE transmits a corresponding PUSCH based on the transmission precoding matrix corresponding to each transmission beam, which improves reliability.

In order to clarify the object, characteristic and advantages of embodiments of the present disclosure, embodiments of present disclosure will be described clearly in detail in conjunction with accompanying drawings.

Figure 1:
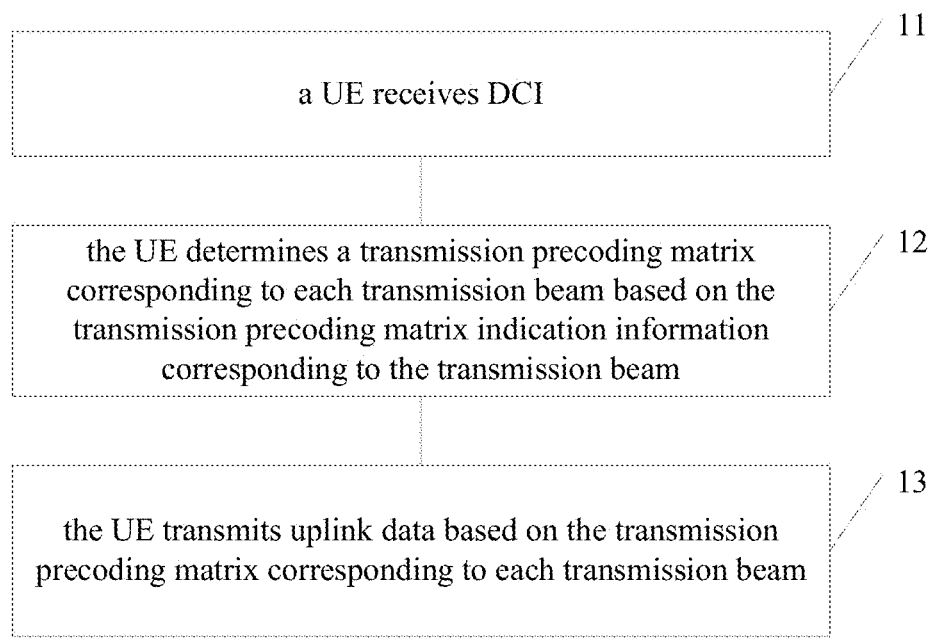
FIG. 1 is a flow chart of an uplink data transmission method.

FIG. 1 is a flow chart of an uplink data transmission method. The method may include steps 11, 12 and 13.

In 11, a UE receives DCI.

The DCI includes a sounding reference signal resource indication field and a precoding information field, the sounding reference signal resource indication field includes indication information of two or more transmission beams corresponding to to-be-transmitted uplink data, and the precoding information field includes transmission precoding matrix indication information corresponding to each of the two or more transmission beams.

In some embodiments, the to-be-transmitted uplink data is PUSCH. It is assumed that the number of transmission beams corresponding to the to-be-transmitted PUSCH is 2, the transmission beams including transmission beam 1 and transmission beam 2. In this case, the DCI should include transmission transmission precoding matrix indication information corresponding to transmission beam 1 and transmission precoding matrix indication information corresponding to transmission beam 2.

In some embodiments, two or more precoding information fields may be set in the DCI. The two or more precoding information fields are in one-to-one correspondence with the transmission beams corresponding to the to-be-transmitted uplink data, and each of the precoding information fields includes the transmission precoding matrix indication information corresponding to the corresponding transmission beam. That is, different transmission precoding matrix indication information is set in DCI, to be used to respectively indicate transmission precoding matrices, so that the transmission precoding matrices corresponding to different transmission beams can be indicated in DCI.

In some embodiments, only one transmission precoding matrix indication information may be set in the DCI, and the one transmission precoding matrix indication information corresponds to all the transmission beams. The transmission precoding matrices corresponding to all the transmission beams are indicated by the precoding information field.

In 12, the UE determines a transmission precoding matrix corresponding to each transmission beam based on the transmission precoding matrix indication information corresponding to the transmission beam.

In some embodiments, when the DCI includes multiple transmission precoding matrix indication information, each precoding information matrix indication information may include a transmission precoding matrix index value. By searching a corresponding precoding matrix table, the corresponding precoding matrix can be obtained based on the transmission precoding matrix index value.

Table 1 is one of the precoding matrix tables in the 3GPP TS38.212 specification, and the same precoding matrix table corresponds to the same number of layers. For a UE that supports coherent codebook transmission with two antenna ports, the corresponding precoding matrix can be obtained from Table 1. For example, as shown in Table 1, when the precoding matrix index value is 2, the corresponding precoding matrix is $$\frac{1}{\sqrt{2}}\begin{bmatrix}1\\0\end{bmatrix}.$$

TABLE 1

| TPMI index value | precoding matrix |
|---|---|
| 0 | $\frac{1}{\sqrt{2}}\begin{bmatrix}1\\0\end{bmatrix}$ |
| 1 | $\frac{1}{\sqrt{2}}\begin{bmatrix}0\\1\end{bmatrix}$ |
| 2 | $\frac{1}{\sqrt{2}}\begin{bmatrix}1\\1\end{bmatrix}$ |
| 3 | $\frac{1}{\sqrt{2}}\begin{bmatrix}1\\-1\end{bmatrix}$ |
| 4 | $\frac{1}{\sqrt{2}}\begin{bmatrix}1\\j\end{bmatrix}$ |
| 5 | $\frac{1}{\sqrt{2}}\begin{bmatrix}1\\-j\end{bmatrix}$ |

When only one transmission precoding matrix indication information is set in the DCI, the precoding matrix indication information is transmitted through the precoding information in the DCI, and various methods can be used to indicate the transmission precoding matrices corresponding to all the transmission beams, which is not limited here.

In some embodiments, the two or more transmission beams corresponding to the to-be-transmitted uplink data include a first transmission beam and at least one other transmission beam rather than the first transmission beam. The first transmission beam may be the first transmission beam corresponding to the to-be-transmitted PUSCH in scheduling information. The transmission precoding matrix indication information corresponding to the transmission beams may include the transmission precoding matrix indication information corresponding to the first transmission beam and the transmission precoding matrix indication information corresponding to the at least one other transmission beam.

In some embodiments, the transmission precoding matrix indication information may be a transmission precoding matrix index value. That is, whether it is the transmission precoding matrix indication information corresponding to the first transmission beam or the at least one other transmission beam, the transmission precoding matrix indication information may be the transmission precoding matrix index value. Based on the transmission precoding matrix index value, the corresponding precoding matrix can be obtained by searching the corresponding precoding matrix table.

In some embodiments, the transmission precoding matrix indication information corresponding to the first transmission beam is a transmission precoding matrix index value corresponding to the first transmission beam, and the transmission precoding matrix indication information corresponding to the at least one other transmission beam is position information of the transmission precoding matrix corresponding to the at least one other transmission beam in a transmission precoding matrix index value set.

The transmission precoding matrix index value set includes the transmission precoding matrix index value corresponding to the first transmission beam, and the transmission precoding matrices in the transmission precoding matrix index value set are disposed in a same precoding matrix table, and have a same number of layers.

That is, in addition to specifically indicating the transmission precoding matrix index value of the first transmission beam, the base station may merely indicate in the DCI position information of the transmission precoding matrix index values corresponding to other transmission beams in the transmission precoding matrix index value set. An order of the transmission precoding matrix index values in the set is the same as that in the precoding matrix table. After the transmission precoding matrix index value set is determined, the transmission precoding matrix index value corresponding to any one of the other transmission beams is determined according to information carried in the DCI.

For example, the base station may indicate in the DCI that a transmission precoding matrix index value corresponding to a second transmission beam is a third transmission precoding matrix index value in the transmission precoding matrix index value set, and a transmission precoding matrix index value corresponding to a third transmission beam is a second transmission precoding matrix index value in the transmission precoding matrix index value set.

In existing specifications, the precoding matrix table where the corresponding transmission precoding matrix of the first transmission beam is located is unique and deterministic. Based on the transmission precoding matrix corresponding to the first transmission beam, the precoding matrix table can be determined, and then a precoding matrix with the same number of layers as the transmission precoding matrix corresponding to the first transmission beam is determined from the precoding matrix table to form the transmission precoding matrix index value set.

Accordingly, said determining a transmission precoding matrix corresponding to each transmission beam based on the transmission precoding matrix indication information corresponding to the transmission beam includes: determining the transmission precoding matrix index value set based on the transmission precoding matrix indication information corresponding to the first transmission beam; determining at least one transmission precoding matrix index value corresponding to the at least one other transmission beam in the transmission precoding matrix index value set based on the transmission precoding matrix indication information corresponding to the at least one other transmission beam; and determining the transmission precoding matrix corresponding to each transmission beam based on the transmission precoding matrix index value corresponding to the transmission beam.

In some embodiments, the transmission precoding matrix indication information corresponding to the transmission beams is first code point indication information, and code points indicated by the first code point indication information correspond to the transmission precoding matrices corresponding to the transmission beams, and a number of the transmission precoding matrices corresponding to the code points indicated by the first code point indication information matches a number of the transmission beams.

In some embodiments, a code point represents a status consisting of several bits. For example, two bits include 4 statuses of 00, 01, 10 and 11, i.e., 4 kinds of code points.

To save bits, the precoding matrix corresponding to each code point may be preset. Each code point may correspond to one precoding matrix, or two or more precoding matrices, which is not specifically limited. In the precoding information field of the DCI, the transmission precoding matrix is indicated by first code point indication information which may merely indicate one code point, or two or more code points. A number of precoding matrices corresponding to each code point may be the same or different. Regardless of the number of code points indicated by the first code point indication information, the number of the transmission precoding matrices corresponding to the indicated code points matches the number of the transmission beams. For example, when the number of transmission beams is three, the number of the transmission precoding matrices corresponding to the indicated code points should also be three.

After obtaining the first code point indication information, the UE may determine the precoding matrices corresponding to the uplink data sent by different transmission beams in current scheduling. For example, the transmission precoding matrices corresponding to the indicated code point may be sequentially used as the transmission precoding matrices of the transmission beams scheduled.

In 13, the UE transmits uplink data based on the transmission precoding matrix corresponding to each transmission beam.

After determining the transmission precoding matrix index value corresponding to each transmission beam, the corresponding transmission precoding matrix may be obtained by searching the precoding matrix table. The number of columns of each transmission precoding matrix is the number of layers corresponding to the transmission beam. The transmission precoding matrix and layer number information are used to transmit corresponding uplink data through the corresponding transmission beam.

In existing specifications, when a PTRS is included in the PUSCH, the DCI further includes a PTRS port indication information field to indicate PTRS port configuration information. When the PDCCH schedules a UE to send multiple PUSCHs, the UE needs to support each PUSCH to use q different transmission beam, and the PTRS port configurations may also be different for different transmission beams. However, there is no solution for how to indicate the PTRS port configuration corresponding to multiple transmission beams in DCI.

To solve this problem, in an embodiment of the present disclosure, to save bits, the code points indicated by the first code point indication information further correspond to PTRS port configuration information corresponding to the transmission beams, and a number of the PTRS port configuration information corresponding to the code points indicated by the first code point indication information matches the number of the transmission beams. In this case, the PTRS port configuration information corresponding to each of the transmission beams is indicated by the precoding information field in the DCI, and the PTRS port indication information field may be filled with zeros, and does not carry useful information.

Each code point may correspond to merely one piece of PTRS port configuration information, or two or more pieces of PTRS port configuration information. A number of the corresponding PTRS port configuration information of each code point may be the same or different. Regardless of the number of the code points indicated by the first code point indication information, the number of the PTRS port configuration information corresponding to the indicated code points matches the number of the transmission beams. For example, when the number of the transmission beams is 2, the number of the PTRS ports corresponding to the indicated code points should also be 2.

The PTRS port configuration information is associated with the transmission precoding matrix in a correspondence. For example, for a UE that supports full coherent codebook transmission, one transmission precoding matrix corresponds to one PTRS port, and for a UE that supports partial coherent codebook transmission, one transmission precoding matrix may correspond to two ports. Therefore, the method further includes: determining a PTRS port corresponding to each transmission beam based on the PTRS port configuration information corresponding to the first code point indication information and the transmission precoding matrix corresponding to the first code point indication information, and transmitting the uplink data based on the transmission precoding matrix and the PTRS port corresponding to each transmission beam.

Specifically, after obtaining the first code point indication information, the transmission precoding matrix of the corresponding transmission beam may be obtained based on the first code point indication information, a number of PTRS ports configured by the corresponding PTRS port configuration information may be determined based on the transmission precoding matrix, and the configuration of each PTRS port can be obtained from the PTRS port configuration information based on the number of PTRS ports.

In some embodiments, the DCI further includes a PTRS port indication information field which includes PTRS port configuration information corresponding to each transmission beam. The method further includes: determining a PTRS port corresponding to each transmission beam based on the PTRS configuration information, so as to transmit the uplink data based on the transmission precoding matrix and the PTRS port corresponding to each transmission beam.

In some embodiments, the PTRS port indication information field includes two or more pieces of PTRS port configuration information which are respectively associated with the transmission beams in one-to-one correspondence. Each PTRS port indication information field includes the PTRS port configuration information corresponding to the corresponding transmission beam. The PTRS port corresponding to the transmission beam is configured through each PTRS port indication information field.

In some embodiments, the PTRS port indication information field includes one piece of PTRS port configuration information which is a second code point indication information, a number of the PTRS port configuration information corresponding to the code points indicated by the second code point indication information matches the number of the transmission beams.

In some embodiments, the PTRS port configuration information corresponding to each code point may be preset. Each code point may correspond to one piece of PTRS port configuration information, or two or more pieces of PTRS port configuration information, which is not specifically limited. In the PTRS port indication information field of the DCI, the PTRS port is configured through the second code point indication information which may merely indicate one code point, or multiple code points. Numbers of PTRS port configuration information corresponding to code points may be the same or different. Regardless of the number of code points indicated by the second code point indication information, the number of PTRS port configuration information corresponding to the indicated code point matches the number of the transmission beams.

After obtaining the second code point indication information, the UE may determine the PTRS port configuration information corresponding to the PUSCH sent by different transmission beams under current scheduling. For example, the PTRS port configuration information corresponding to the indicated code point may be sequentially used as the PTRS port configuration information of the scheduled transmission beams.

From above, as the precoding matrix and PTRS ports corresponding to multiple transmission beams can be indicated in the DCI, reliable data transmission can be achieved.

To enable those skilled in the art to better understand and implement the present disclosure, the apparatus and computer-readable storage media corresponding to the above method are described in detail below.

Figure 2:
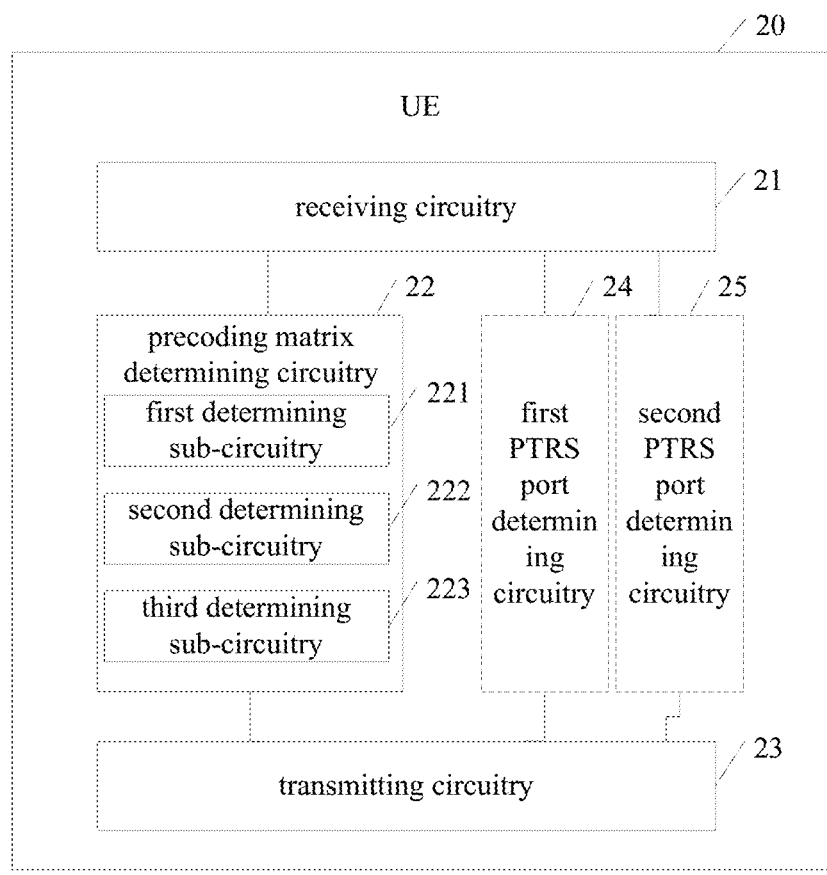
FIG. 2 is a structural diagram of a UE according to an embodiment.

FIG. 2 is a structural diagram of a UE 20 according to an embodiment. The UE 20 includes a receiving circuitry 21, a precoding matrix determining circuitry 22 and a transmitting circuitry 23.

The receiving circuitry 21 is configured to receive DCI, wherein the DCI includes a sounding reference signal resource indication field and a precoding information field, the sounding reference signal resource indication field includes indication information of two or more transmission beams corresponding to to-be-transmitted uplink data, and the precoding information field includes transmission precoding matrix indication information corresponding to each of the two or more transmission beams.

The precoding matrix determining circuitry 22 is configured to determine a transmission precoding matrix corresponding to each transmission beam based on the transmission precoding matrix indication information corresponding to the transmission beam.

The transmitting circuitry 23 is configured to transmit uplink data based on the transmission precoding matrix corresponding to each transmission beam.

In some embodiments, the precoding information field includes two or more pieces of transmission precoding matrix indication information which are respectively associated with all the transmission beams in one-to-one correspondence.

In some embodiments, the transmission precoding matrix indication information is a transmission precoding matrix index value.

In some embodiments, the precoding matrix determining circuitry 22 is configured to determine the transmission precoding matrix corresponding to each transmission beam based on the transmission precoding matrix index value corresponding to the transmission beam.

In some embodiments, the two or more transmission beams corresponding to the to-be-transmitted uplink data include a first transmission beam and at least one other transmission beam rather than the first transmission beam; the transmission precoding matrix indication information corresponding to the first transmission beam is a transmission precoding matrix index value corresponding to the first transmission beam; the transmission precoding matrix indication information corresponding to the at least one other transmission beam is position information of the transmission precoding matrix corresponding to the at least one other transmission beam in a transmission precoding matrix index value set; and the transmission precoding matrix index value set includes the transmission precoding matrix index value corresponding to the first transmission beam, and the transmission precoding matrices in the transmission precoding matrix index value set are disposed in a same precoding matrix table, and have a same number of layers.

In some embodiments, the precoding matrix determining circuitry 22 includes: a first determining sub-circuitry 221 configured to determine the transmission precoding matrix index value set based on the transmission precoding matrix indication information corresponding to the first transmission beam; a second determining sub-circuitry 222 configured to determine at least one transmission precoding matrix index value corresponding to the at least one other transmission beam in the transmission precoding matrix index value set based on the transmission precoding matrix indication information corresponding to the at least one other transmission beam; and a third determining sub-circuitry 223 configured to determine the transmission precoding matrix corresponding to each transmission beam based on the transmission precoding matrix index value corresponding to the transmission beam.

In some embodiments, the precoding information field includes a piece of transmission precoding matrix indication information which corresponds to all the transmission beams.

In some embodiments, the transmission precoding matrix indication information corresponding to the transmission beams is first code point indication information, and code points indicated by the first code point indication information correspond to the transmission precoding matrices corresponding to the transmission beams, and a number of the transmission precoding matrices corresponding to the code points indicated by the first code point indication information matches a number of the transmission beams.

In some embodiments, the code points indicated by each first code point indication information correspond to one transmission precoding matrix, or two or more transmission precoding matrices.

In some embodiments, the code points indicated by the first code point indication information further correspond to PTRS port configuration information corresponding to the transmission beams, and a number of the PTRS port configuration information corresponding to the code points indicated by the first code point indication information matches the number of the transmission beams.

The UE 20 further includes a first PTRS port determining circuitry 24 configured to determine a PTRS port corresponding to each transmission beam based on the PTRS port configuration information corresponding to the first code point indication information and the transmission precoding matrix corresponding to the first code point indication information, and the transmitting circuitry 23 is configured to transmit the uplink data based on the transmission precoding matrix and the PTRS port corresponding to each transmission beam.

In some embodiments, the DCI further includes a PTRS port indication information field which includes PTRS port configuration information corresponding to each transmission beam.

The UE 20 further includes a second PTRS port determining circuitry 25 configured to determine a PTRS port corresponding to each transmission beam based on the PTRS configuration information; and the transmitting circuitry 23 is configured to transmit the uplink data based on the transmission precoding matrix and the PTRS port corresponding to each transmission beam.

In some embodiments, the PTRS port indication information field includes two or more pieces of PTRS port configuration information which are respectively associated with the transmission beams in one-to-one correspondence.

In some embodiments, the PTRS port indication information field includes one piece of PTRS port configuration information which is a second code point indication information, and a number of the PTRS port configuration information corresponding to the code points indicated by the second code point indication information matches the number of the transmission beams.

It could be understood that, in some embodiments, the DCI either configures PTRS ports for different transmission beams through the precoding information field, or through the PTRS port indication information field. Accordingly, the UE 20 either determines the PTRS port corresponding to each transmission beam by the first PTRS port determining circuitry 24, or by the second PTRS port determining circuitry 25.

From above, for the UE 20 in the embodiments of the present disclosure, as the DCI indicates the precoding matrices and the PTRS ports corresponding to different transmission beams, reliable transmission of uplink data may be achieved.

An apparatus (a virtual apparatus) including the receiving circuitry 21, the precoding matrix determining circuitry 22 and the transmitting circuitry 23 may be, for example, a chip or a chip module.

Embodiments of the present disclosure further provide a computer-readable storage medium having computer instructions stored thereon, where when the computer instructions are executed by a processor, any one of the above uplink data transmission methods is performed.

In some embodiments, the computer-readable storage medium may include a ROM, a RAM, a magnetic disk or a compact disk, and the like.

An embodiment of the present disclosure further provides a UE including a memory and a processor, where the memory stores computer instructions, and when the processor runs the computer instructions, any one of the above uplink data transmission methods is performed.

Modules/units included in each apparatus and product described in the above embodiments may be software modules/units, hardware modules/units, or a combination of software modules/units and hardware modules/units. For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An uplink data transmission method, comprising:
receiving Downlink Control Information (DCI), wherein the DCI comprises a sounding reference signal resource indication field and a precoding information field, the sounding reference signal resource indication field comprises indication information of two or more transmission beams corresponding to to-be-transmitted uplink data, and the precoding information field comprises transmission precoding matrix indication information corresponding to each of the two or more transmission beams;
determining a transmission precoding matrix corresponding to each transmission beam based on the transmission precoding matrix indication information corresponding to each transmission beam; and
transmitting uplink data based on the transmission precoding matrix corresponding to each transmission beam.

2. The method according to claim 1, wherein the precoding information field comprises two or more pieces of transmission precoding matrix indication information which are respectively associated with all the transmission beams in one-to-one correspondence.

3. The method according to claim 2, wherein the transmission precoding matrix indication information is a transmission precoding matrix index value.

4. The method according to claim 3, wherein said determining the transmission precoding matrix corresponding to each transmission beam based on the transmission precoding matrix indication information corresponding to each transmission beam comprises:
determining the transmission precoding matrix corresponding to each transmission beam based on the transmission precoding matrix index value corresponding to each transmission beam.

5. The method according to claim 2, wherein the two or more transmission beams corresponding to the to-be-transmitted uplink data comprise a first transmission beam and at least one other transmission beam rather than the first transmission beam;
the transmission precoding matrix indication information corresponding to the first transmission beam is a transmission precoding matrix index value corresponding to the first transmission beam;
the transmission precoding matrix indication information corresponding to the at least one other transmission beam is position information of the transmission precoding matrix corresponding to the at least one other transmission beam in a transmission precoding matrix index value set; and
the transmission precoding matrix index value set comprises the transmission precoding matrix index value corresponding to the first transmission beam, and the transmission precoding matrices in the transmission precoding matrix index value set are disposed in a same precoding matrix table, and have a same number of layers.

6. The method according to claim 5, wherein said determining the transmission precoding matrix corresponding to each transmission beam based on the transmission precoding matrix indication information corresponding to each transmission beam comprises:
determining the transmission precoding matrix index value set based on the transmission precoding matrix indication information corresponding to the first transmission beam;
determining at least one transmission precoding matrix index value corresponding to the at least one other transmission beam in the transmission precoding matrix index value set based on the transmission precoding matrix indication information corresponding to the at least one other transmission beam; and
determining the transmission precoding matrix corresponding to each transmission beam based on the transmission precoding matrix index value corresponding to each transmission beam.

7. The method according to claim 1, wherein the precoding information field comprises a piece of transmission precoding matrix indication information which corresponds to all the transmission beams.

8. The method according to claim 7, wherein the transmission precoding matrix indication information corresponding to all the transmission beams is first code point indication information, code points indicated by the first code point indication information correspond to the transmission precoding matrices corresponding to all the transmission beams, and a number of the transmission precoding matrices corresponding to the code points indicated by the first code point indication information matches a number of all the transmission beams.

9. The method according to claim 8, wherein the code points indicated by each first code point indication information correspond to one transmission precoding matrix, or two or more transmission precoding matrices.

10. The method according to claim 9, wherein the code points indicated by the first code point indication information further correspond to Phase Tracking Reference Signal (PTRS) port configuration information corresponding to all the transmission beams, and a number of the PTRS port configuration information corresponding to the code points indicated by the first code point indication information matches the number of all the transmission beams, and
the method further comprises: determining a PTRS port corresponding to each transmission beam based on the PTRS port configuration information corresponding to the first code point indication information and the transmission precoding matrix corresponding to the first code point indication information, and transmitting the uplink data based on the transmission precoding matrix and the PTRS port corresponding to each transmission beam.

11. The method according to claim 1, wherein the DCI further comprises a PTRS port indication information field which comprises PTRS port configuration information corresponding to each transmission beam; and
the method further comprises: determining a PTRS port corresponding to each transmission beam based on the PTRS configuration information, so as to transmit the uplink data based on the transmission precoding matrix and the PTRS port corresponding to each transmission beam.

12. The method according to claim 11, wherein the PTRS port indication information field comprises two or more pieces of PTRS port configuration information which are respectively associated with the two or more transmission beams in one-to-one correspondence.

13. The method according to claim 11, wherein the PTRS port indication information field comprises one piece of PTRS port configuration information which is a second code point indication information, and a number of the PTRS port configuration information corresponding to the code points indicated by the second code point indication information matches a number of the two or more transmission beams.

14. A non-transitory computer readable storage medium storing one or more programs, the one or more programs comprising computer instructions, which, when executed by a processor, cause the processor to:
receive Downlink Control Information (DCI), wherein the DCI comprises a sounding reference signal resource indication field and a precoding information field, the sounding reference signal resource indication field comprises indication information of two or more transmission beams corresponding to to-be-transmitted uplink data, and the precoding information field comprises transmission precoding matrix indication information corresponding to each of the two or more transmission beams;
determine a transmission precoding matrix corresponding to each transmission beam based on the transmission precoding matrix indication information corresponding to each transmission beam; and
transmit uplink data based on the transmission precoding matrix corresponding to each transmission beam.

15. A terminal comprising a memory and a processor, wherein the memory stores one or more programs, the one or more programs comprising computer instructions, which, when executed by the processor, cause the processor to:
receive Downlink Control Information (DCI), wherein the DCI comprises a sounding reference signal resource indication field and a precoding information field, the sounding reference signal resource indication field comprises indication information of two or more transmission beams corresponding to to-be-transmitted uplink data, and the precoding information field comprises transmission precoding matrix indication information corresponding to each of the two or more transmission beams;

determine a transmission precoding matrix corresponding to each transmission beam based on the transmission precoding matrix indication information corresponding to each transmission beam; and transmit uplink data based on the transmission precoding matrix corresponding to each transmission beam.

16. The terminal according to claim 15, wherein the precoding information field comprises two or more pieces of transmission precoding matrix indication information which are respectively associated with all the transmission beams in one-to-one correspondence.

17. The terminal according to claim 16, wherein the transmission precoding matrix indication information is a transmission precoding matrix index value.

18. The terminal according to claim 17, wherein said determining the transmission precoding matrix corresponding to each transmission beam based on the transmission precoding matrix indication information corresponding to each transmission beam comprises:

determining the transmission precoding matrix corresponding to each transmission beam based on the transmission precoding matrix index value corresponding to the transmission beam.

19. The terminal according to claim 16, wherein the two or more transmission beams corresponding to the to-be-transmitted uplink data comprise a first transmission beam and at least one other transmission beam rather than the first transmission beam;

the transmission precoding matrix indication information corresponding to the first transmission beam is a transmission precoding matrix index value corresponding to the first transmission beam;

the transmission precoding matrix indication information corresponding to the at least one other transmission beam is position information of the transmission precoding matrix corresponding to the at least one other transmission beam in a transmission precoding matrix index value set; and the transmission precoding matrix index value set comprises the transmission precoding matrix index value corresponding to the first transmission beam, and the transmission precoding matrices in the transmission precoding matrix index value set are disposed in a same precoding matrix table, and have a same number of layers.

20. The terminal according to claim 19, wherein said determining the transmission precoding matrix corresponding to each transmission beam based on the transmission precoding matrix indication information corresponding to each transmission beam comprises:

determining the transmission precoding matrix index value set based on the transmission precoding matrix indication information corresponding to the first transmission beam;

determining at least one transmission precoding matrix index value corresponding to the at least one other transmission beam in the transmission precoding matrix index value set based on the transmission precoding matrix indication information corresponding to the at least one other transmission beam; and determining the transmission precoding matrix corresponding to each transmission beam based on the transmission precoding matrix index value corresponding to each transmission beam.

\* \* \* \* \*